United States Patent

Recalde

[11] Patent Number: 5,590,915
[45] Date of Patent: Jan. 7, 1997

[54] PIPELAY METHOD AND DEVICES

[75] Inventor: Carlos E. Recalde, Irvine, Calif.

[73] Assignee: Stena Offshore Limited, Aberdeen, Great Britain

[21] Appl. No.: 211,262

[22] PCT Filed: Oct. 16, 1992

[86] PCT No.: PCT/GB92/01910

§ 371 Date: Jul. 28, 1994

§ 102(e) Date: Jul. 28, 1994

[87] PCT Pub. No.: WO93/08422

PCT Pub. Date: Apr. 29, 1993

[30] Foreign Application Priority Data

Oct. 17, 1991 [GB] United Kingdom .................. 9122031

[51] Int. Cl.⁶ .................................................. F16L 55/00
[52] U.S. Cl. ........................ 285/119; 285/177; 285/286; 285/403; 405/168.3
[58] Field of Search ........................ 285/403, 404, 285/177, 286, 119; 405/167, 168.1, 168.3, 168.4

[56] References Cited

U.S. PATENT DOCUMENTS

| H945 | 8/1991 | Taliaferro et al. . |
|---|---|---|
| 757,573 | 4/1904 | Spencer ............................ 285/223 X |
| 1,722,676 | 7/1929 | Parker ............................ 285/177 |
| 1,861,814 | 6/1932 | Peters ............................ 285/404 X |
| 1,982,610 | 11/1934 | Harris ............................ 285/190 X |
| 2,154,407 | 4/1939 | Miller ............................ 285/177 |
| 3,237,438 | 3/1966 | Tesson . |
| 3,372,461 | 3/1968 | Tesson . |
| 3,602,531 | 8/1971 | Patry ............................ 285/177 |
| 3,608,321 | 9/1971 | Richardson, Jr. et al. . |
| 3,630,461 | 12/1971 | Suganti et al. . |
| 3,641,778 | 2/1972 | Gibson . |
| 3,680,342 | 8/1972 | Mott et al. . |
| 3,712,100 | 1/1973 | Key et al. . |
| 3,747,356 | 7/1973 | Lochridge et al. . |
| 3,855,835 | 12/1974 | Tisdale, III et al. . |
| 3,982,402 | 9/1976 | Lang et al. . |
| 4,117,692 | 10/1978 | Oberg . |
| 4,157,023 | 6/1979 | Tisdale et al. . |
| 4,230,421 | 10/1980 | Springett et al. . |
| 4,243,345 | 1/1981 | Cha et al. . |
| 4,260,287 | 4/1981 | Uyeda et al. . |
| 4,260,288 | 4/1981 | Ellers et al. . |
| 4,269,540 | 5/1981 | Uyeda et al. . |
| 4,273,469 | 6/1981 | Lunde . |
| 4,274,799 | 6/1981 | Tisdale, III et al. . |
| 4,297,054 | 10/1981 | Yenzer et al. . |
| 4,340,322 | 7/1982 | Springett et al. . |
| 4,345,855 | 8/1982 | Uyeda et al. . |
| 4,629,218 | 12/1986 | Dubois ............................ 285/177 X |
| 4,687,376 | 8/1987 | Recalde . |
| 4,721,410 | 1/1988 | Recalde . |

(List continued on next page.)

FOREIGN PATENT DOCUMENTS

| 163483 | 5/1921 | United Kingdom .................. 285/177 |
|---|---|---|
| 601103 | 4/1948 | United Kingdom . |
| 1601730 | 11/1981 | United Kingdom . |
| 1602549 | 11/1981 | United Kingdom . |
| 2199631 | 7/1988 | United Kingdom . |
| 2224803 | 5/1990 | United Kingdom . |

Primary Examiner—Dave W. Arola
Attorney, Agent, or Firm—Ratner & Prestia

[57] ABSTRACT

A reel pipelay vessel is used to lay a first pipeline (6) and a second pipeline (7) subsequently. The second pipeline (7) is spooled on top of the first pipeline (6) at a shore base by use of transition joint (11) secured to the trailing end of the first pipeline (6) and to the leading end of the second pipeline (7). A variety of transition joints are described. In each case, the bending characteristic of the transition joint is selected to avoid buckling during spooling of the pipe transition. In an alternative embodiment the transition joint comprises a first pipe section (21) of first diameter hingeably connected to a second pipe section (22) of second diameter, the first and second pipe sections being bent to a common radius corresponding to the radius of curvature of the first pipe when spooled onto a reel.

15 Claims, 4 Drawing Sheets

U.S. PATENT DOCUMENTS

| | | |
|---|---|---|
| 4,721,411 | 1/1988 | Recalde . |
| 4,723,874 | 2/1988 | Recalde . |
| 4,789,108 | 12/1988 | Recalde . |
| 4,820,082 | 4/1989 | Recalde . |
| 4,913,080 | 4/1990 | Kindem et al. . |
| 4,917,540 | 4/1990 | Recalde . |
| 4,961,671 | 10/1990 | Recalde . |
| 4,984,934 | 1/1991 | Recalde . |
| 5,306,050 | 4/1994 | Laflin et al. .................. 285/370 X |

PIPELAY METHOD AND DEVICES

This invention relates to an improved method of laying subsea pipeline from a reel vessel.

It is known to lay a subsea pipeline by welding pipe into long lengths at a shore base, spooling the pipe onto a reel on a vessel, and unspooling the pipe from the vessel at the desired location. The pipe undergoes plastic deformation on spooling, and on unspooling must be straightened and held in tension between the vessel and the seabed. See for example U.S. Pat. Nos. 4,157,023 and 4,230,421 which describe the construction and operation of the reelship "Stena Apache" (formerly "Apache").

This method has the benefit that most of the pipe preparation (welding, coating, testing) can be carried out ashore under cover in optimum conditions, and the vessel operation can be optimised for laying when on station. However, the vessel transit time between the shore base and the laying site is non-productive. It is therefore-important to load the vessel reel fully in order to minimise transit time.

There are instances where it is desired to lay pipelines of different diameters, each size being of a length less than the capacity of the reel. It may be uneconomic to transport such pipelines separately. If, however, the pipelines are simply secured end to end during spooling, then due to the difference in bending stiffness between the pipes an irreversible deformation is likely to occur as the join approaches the reel during spooling up.

An object of the present invention is to overcome or mitigate this problem.

From one aspect, the invention provides a method of spooling a first pipe of first diameter and a second pipe of second diameter onto a reel, the pipe being plastically deformed on spooling to conform to the reel, the method comprising spooling the first pipe onto the reel, spooling the second pipe onto the reel on top of the first pipe, and interconnecting the trailing end of the first pipe to the leading end of the second pipe via a transition joint at some time before said trailing end reaches the reel.

The transition joint may be an initially straight, generally tubular member having a bending moment equal to or greater than the difference in bending moment between the first and second pipes.

Preferably, the diameter of the first pipe is larger than the diameter of the second pipe.

Alternatively, the transition joint may comprise first and second pipe sections hingeably connected together and preformed to a radius conforming to that to which adjacent pipe is bent on the reel during spooling.

The invention, from another aspect, provides a transition joint for use in the foregoing method.

The joint may be a tapered member formed integrally or by a plurality of sections secured together. Preferably, the outer surface is smoothly tapered and the inner surface formed by conical and cylindrical sections.

Alternatively, the joint may comprise a series of pipe sections of reducing diameter. The sections may overlap, or may be joined by generally conical reducers.

In another form the joint comprises first and second pipe sections bent to a common radius and hingeably connected together.

Embodiments of the present invention will now be described, by way of example only, with reference to the drawings in which.

Figure 1:
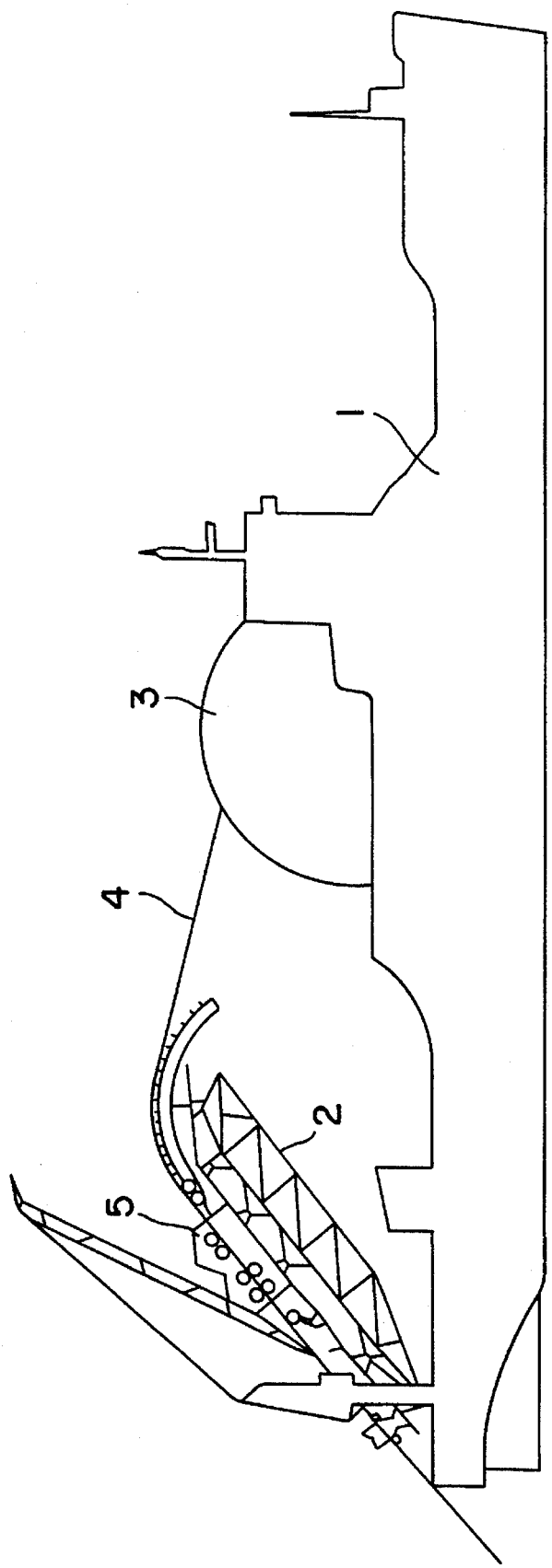
FIG. 1 is a schematic side view of a reel pipelay ship.

FIG. 1 shows a pipelay vessel 1 having a horizontal-axis reel 3 from which pipe 4 is unspooled for laying via a straightening and tensioning device 5 mounted on a pivotal take-off ramp 2.

Figure 2:
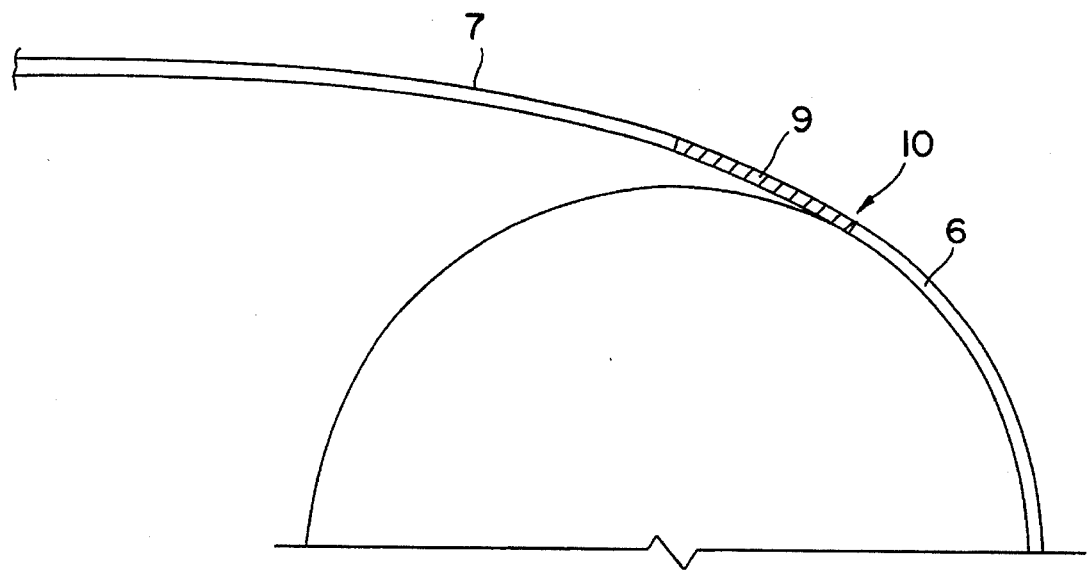
FIG. 2 is a diagrammatic illustration of pipe being spooled.
Figure 3:
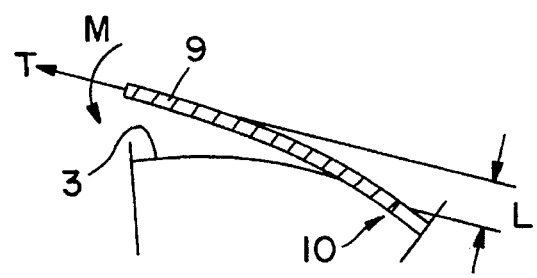
FIG. 3 illustrates the forces acting in FIG. 2.

FIGS. 2 and 3 illustrate the case where a smaller line 7 is being spooled on top of a larger line 6, with a transition zone 9. Owing to the difference in rigidity of the lines 6 and 7, a point of maximum bending occurs when the point 10 contacts the reel surface 3 (i.e. normally the surface formed by the underlying turns) and a buckled hinge is likely to occur at this point. A tension force T is provided during spooling by dragging pipe from its storage rack, up the ramp 2 and through the tensioner 5. In the case shown, in order to bend the trailing end of the larger pipe 6 to the reel, the smaller pipe must apply a bending force greater than its own plastic capacity plus an additional bending moment $M=T\times L$, where L is the moment arm equal to the projected distance between the point where tension is applied and the point where bending is taking place.

A buckled hinge can be avoided by using a transition joint dimensioned such that the additional moment M is equal to or greater than the difference of bending moment capacity between the lines 6 and 7.

Figure 4:
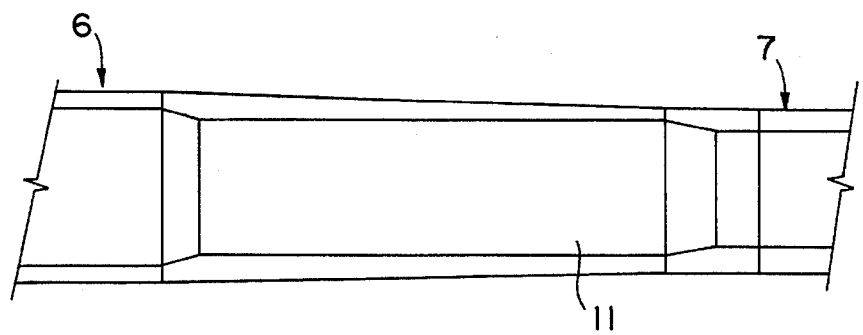
FIGS. 4–9 are diagrammatic cross-sectional side views of embodiments of transition pieces for use in the invention.

FIG. 4 shows one embodiment of transition joint suitable for meeting this condition. The joint 11 comprises an integral sleeve whose ends have inside and outside diameters matching those of the adjacent pipes 6 and 7. The outer surface-of the joint 11 is machined to taper smoothly. The inner surface is machined, for example in conical and cylindrical surfaces as shown, to provide the required bending resistance. The joint 11 is butt welded to the pipes 6 and 7.

Figure 5:
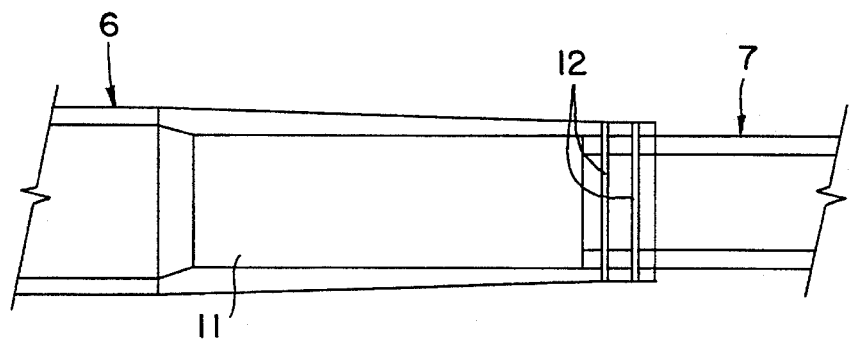
Figure 6:
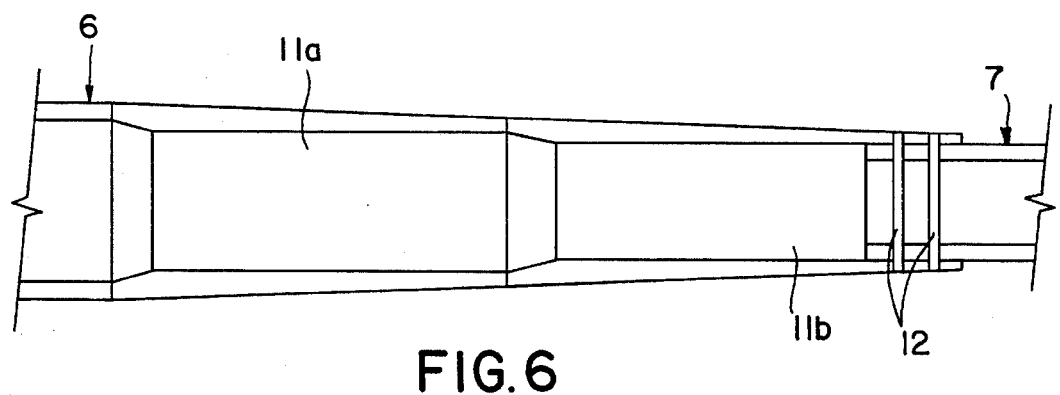

FIG. 5 shows a modified form in which one end of the joint 11 is welded to the pipe 7, while the other end is dimensioned to fit over the pipe 6 and secured to it by pins 12.

Where there is a large difference in pipe diameter, the transition joint may have to be fabricated in stages, as in FIG. 6 where two stages 11a, 11b are welded together.

Figure 7:
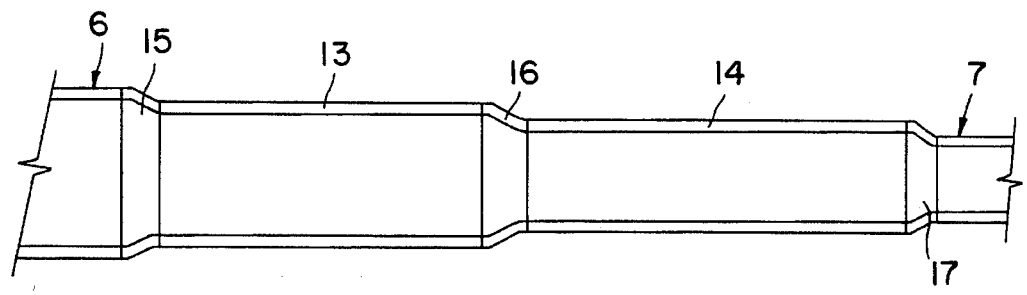
Figure 8:
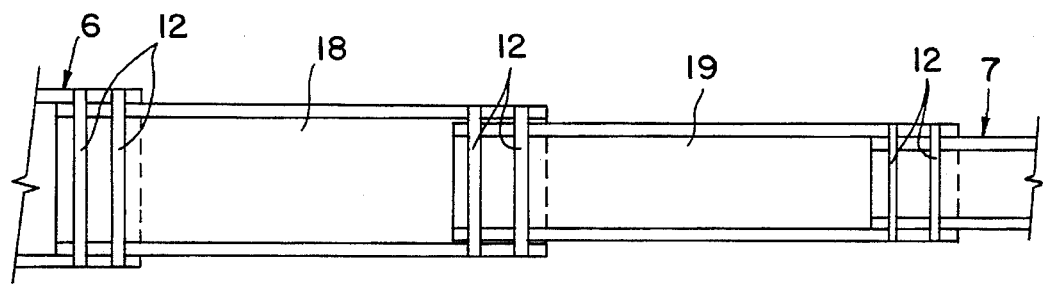

FIG. 7 and 8 illustrate an alternative approach in which the transition from between the larger pipe 6 and the smaller pipe 7 is achieved using a series of pipe sections of reducing diameter. In FIG. 7, intermediate pipe sections 13 and 14 and generally-conical reducers 15, 16, 17 are used in an all-welded arrangement. FIG. 8 shows intermediate pipe sections 18 and 19 in a pinned arrangement.

Figure 9:
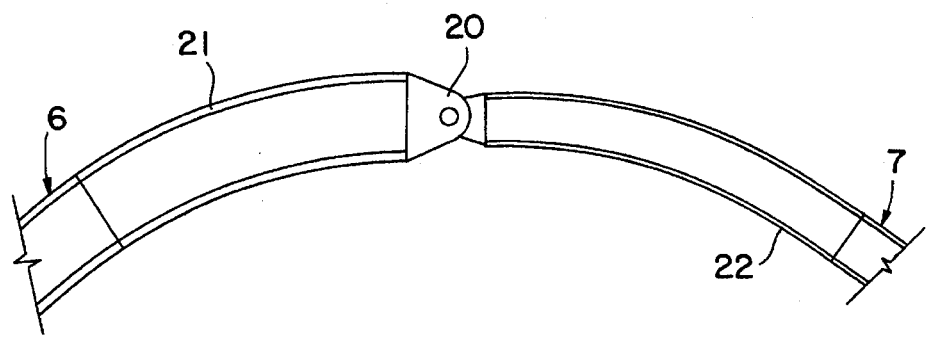

Finally, FIG. 9 illustrates an alternative approach to the problem. Instead of connecting the pipes 6 and 7 via a transition piece adapted to transmit the additional bending moment M, the embodiment of FIG. 9 decouples the bending moments by use of a hinge connection 20 formed between a first curved pipe section 21 and a second curved pipe section 22. Each of the pipe sections 21, 22 has inner and outer diameters matching those of the respective pipe 6, 7. The sections 21, 22 are preformed to the radius-which will occur at the reel surface, and are field-welded to the trailing and leading ends of the pipes 6, 7 during spooling.

The use of the hinged connection allows the tension force to be transmitted to bend the trailing end of the larger pipe, without applying bending moment to the smaller pipe before it reaches the reel.

It will be appreciated that the transition joint is intended for use as a temporary item for facilitating spooling of pipe of different diameter for transport purposes. It is not intended for use as part of the subsea installation itself. The joint will be cut from the end of the larger pipe when laying of the larger pipe is being completed, and will be cut from the smaller pipe before starting to lay it.

Modifications and improvements may be incorporated without departing from the scope of the invention.

I claim:

1. A method of spooling a first pipe of first external diameter and a second pipe of second external diameter different from said first external diameter onto a reel, the pipe being plastically deformed on spooling to conform to the reel, the method comprising spooling the first pipe onto the reel, spooling the second pipe onto the reel on top of the first pipe, and connecting the trailing end of the first pipe to the leading end of the second pipe via a transition joint at some time before said trailing end reaches the reel, said transition joint having a first longitudinal end dimensioned for coupling to said first pipe of first external diameter and having a second longitudinal end dimensioned for coupling to said second pipe of second external diameter different from said first external diameter.

2. A method according to claim 1, in which the transition joint is an initially straight, generally tubular member having a bending moment at least equal to the difference in bending moment between the first and second pipes.

3. A method according to claim 1, in which the transition joint comprises first and second pipe sections hingeably connected together about a hinge axis at adjacent longitudinal ends thereof and preformed in a common plane of curvature to a radius conforming to that to which adjacent pipe is bent on the reel during spooling, said hinge axis being disposed substantially at right angles to said plane of curvature.

4. A method according to claim 1, in which the diameter of the first pipe is larger than the diameter of the second pipe.

5. A transition joint for use in connecting a first pipe of first external diameter and a second pipe of second external diameter different from said first external diameter for spooling onto a reel in such a manner that said pipe is plastically deformed on spooling to conform to the reel, said transition joint comprising a straight, generally tubular member having a first end dimensioned for coupling to said first pipe of first external diameter, a second end dimensioned for coupling to said second pipe of second external diameter different from said first external diameter, and said member having a bending moment at least equal to the difference in bending moment between the first and second pipes.

6. A transition joint according to claim 5, the joint being an integral tapered member.

7. A transition joint according to claim 6, in which the outer surface of said member is smoothly tapered from said first end thereof towards said second end thereof while its inner surface is formed by a plurality of cylindrical portions, each of said cylindrical portions having a substantially constant internal diameter and adjacent cylindrical portions having differing internal diameters, adjacent cylindrical portions each being connected one to the other by a frustoconical portion having first and second internal diameters at either longitudinal end thereof corresponding to the internal diameters of the adjacent cylindrical portions.

8. A transition joint according to claim 5, formed by a series of pipe sections of reducing diameter.

9. A transition joint according to claim 8, in which the pipe sections overlap one within the other.

10. A transition joint according to claim 8, in which the pipe sections are joined by generally conical reducer sections.

11. A transition joint according to any of claim 5 in which at least one end of the joint is adapted to be butt welded to one of the pipes.

12. A transition joint according to claim 5 in which at least one end of the joint is adapted to be coupled to one of the pipes by resting said joint end within said pipe to form an overlap and securing pins through holes in register in said overlap.

13. A transition joint for use in connecting a first pipe of first external diameter and a second pipe of second external diameter different from said first external diameter for spooling onto a reel in such a manner that said pipe is plastically deformed on spooling to conform to the reel, said transition joint comprising a first pipe section dimensioned for coupling to said first pipe of first external diameter, a second pipe section dimensioned for connection to said second pipe of second external diameter different from said first external diameter, and a hinged connection between adjacent longitudinal ends of said first and second pipe sections, said first and second pipe sections being bent in a common plane of curvature to a common radius which, in use, corresponds to the radius of a predetermined length of said first pipe on a predetermined reel, said hinged connection including a hinge axis disposed substantially at right angles to said plane of curvature.

14. A transition joint according to claim 13, in which at least one end of the joint is adapted to be butt welded to one of the pipes.

15. A transition joint according to claim 11, in which at least one end of the joint is adapted to be coupled to one of the pipes by resting said joint end within said pipe to form an overlap and securing pins through holes in register in said overlap.

* * * * *

UNITED STATES PATENT AND TRADE MARK OFFICE
CERTIFICATE OF CORRECTION

PATENT NO. : 5,590,915
DATED : January 7, 1997
INVENTOR(S) : Carlos E. Recalde

It is certified that error appears in the above-identified patent and that said Letters Patent is hereby corrected as shown below:

Column 4, claim 11, line 19, before "claim" delete --any of--.

Signed and Sealed this

Third Day of June, 1997

Attest:

BRUCE LEHMAN

*Attesting Officer*  Commissioner of Patents and Trademarks